United States Patent
Kang et al.

(10) Patent No.: US 11,157,864 B2
(45) Date of Patent: Oct. 26, 2021

(54) METHOD AND DEVICE FOR DISPLAYING LOGISTICS INFORMATION AND COMPUTER READABLE STORAGE MEDIUM

(71) Applicant: BEIJING XIAOMI MOBILE SOFTWARE CO., LTD., Beijing (CN)

(72) Inventors: Shang Ming Xue Kang, Beijing (CN); Yi Zhan Lu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 749 days.

(21) Appl. No.: 15/826,823

(22) Filed: Nov. 30, 2017

(65) Prior Publication Data
US 2018/0165634 A1    Jun. 14, 2018

(30) Foreign Application Priority Data
Dec. 9, 2016 (CN) .......................... 201611128529.7

(51) Int. Cl.
*G06Q 10/08* (2012.01)
*G06Q 50/28* (2012.01)
(Continued)

(52) U.S. Cl.
CPC ......... *G06Q 10/0833* (2013.01); *G06Q 10/08* (2013.01); *G06Q 10/0837* (2013.01);
(Continued)

(58) Field of Classification Search
CPC ........... G06Q 10/0833; G06Q 10/0832; G06Q 10/0834; H04W 4/023; H04W 4/80
See application file for complete search history.

(56) References Cited

U.S. PATENT DOCUMENTS

2002/0169689 A1* 11/2002 Morimoto ............ G06Q 10/083
                                                               705/330
2003/0088534 A1    5/2003 Kalantar et al.
(Continued)

FOREIGN PATENT DOCUMENTS

CN          101315603 A     12/2008
CN          104516634 A     4/2015
(Continued)

OTHER PUBLICATIONS

An Event-processing Architecture for an RFID based Logistics Monitoring System Published by 5th European Workshop on RFID Systems and Technologies (Year: 2009).*
(Continued)

*Primary Examiner* — Zeina Elchanti
(74) *Attorney, Agent, or Firm* — Oblon, McClelland, Maier & Neustadt, L.L.P.

(57) ABSTRACT

The disclosure relates to a method and device for displaying logistics information, and computer readable storage medium. The method includes acquiring a logistics waybill identifier of at least one item from at least one e-commerce client that is installed on an operating system of a terminal and is configured to display a logistics page; acquiring logistics information corresponding to the logistics waybill identifier, wherein the logistics information indicates a logistics progress of the at least one item; aggregating the acquired logistics information of the at least one item; and displaying the aggregated logistics information in a preset display area provided by the operating system.

11 Claims, 17 Drawing Sheets

(51) Int. Cl.
*G06Q 10/10* (2012.01)
*G06F 3/0484* (2013.01)
*H04L 12/58* (2006.01)

(52) U.S. Cl.
CPC ............ *G06Q 10/10* (2013.01); *G06Q 50/28* (2013.01); *G06F 3/04847* (2013.01); *G06F 2203/04803* (2013.01); *H04L 51/20* (2013.01)

(56) References Cited

U.S. PATENT DOCUMENTS

| | | | |
|---|---|---|---|
| 2003/0182265 A1* | 9/2003 | Robbins | B42D 15/006 |
| 2012/0030133 A1* | 2/2012 | Rademaker | G06Q 10/08 |
| | | | 705/333 |
| 2014/0082502 A1 | 3/2014 | Rubel et al. | |
| 2014/0188747 A1 | 7/2014 | D'Urso et al. | |
| 2016/0063065 A1 | 3/2016 | Khatri et al. | |

FOREIGN PATENT DOCUMENTS

| | | |
|---|---|---|
| CN | 105373956 A | 3/2016 |
| WO | WO 2016/196089 A1 | 12/2016 |

OTHER PUBLICATIONS

Extended European Search Report dated Feb. 20, 2018 in corresponding European Patent Application No. 17206296.0, 19 pages.
Combined Office Action and Search Report dated Oct. 10, 2017 in Chinese Patent Application No. 201611128529.7 (with English language concise explanation of relevance), 8 pages.
Office Action dated Dec. 20, 2017 in Chinese Patent Application No. 201611128529.7 (with English language concise explanation of relevance), 8 pages.

* cited by examiner

METHOD AND DEVICE FOR DISPLAYING LOGISTICS INFORMATION AND COMPUTER READABLE STORAGE MEDIUM

CROSS-REFERENCE TO RELATED APPLICATION

This application claims is based on and priority to Chinese Patent Application Serial No. 201611128529.7, filed with the State Intellectual Property Office of P. R. China on Dec. 9, 2016, titled "METHOD AND DEVICE FOR DISPLAYING LOGISTICS INFORMATION," the entire contents of which are incorporated herein by reference.

TECHNICAL FIELD

The present disclosure relates to the field of computer technology, and more particularly to a method and a device for displaying logistics information, and computer readable storage medium.

BACKGROUND

After a user purchases an item via an e-commerce client in a terminal, the supplier will deliver the item to the user in accordance with the delivery address shown in the purchase order through a logistics company. Here, the e-commerce client refers to an application client or a web client that uses electronic transactions to achieve item purchasing and selling services.

In order to allow the user to know logistics information of the item conveniently, the e-commerce client provides a logistics page to the user to display the logistics information of the item. Here, the logistics information is used to indicate the logistics progress of the item, such as, having been shipped, being on the way, being in distribution and having been signed after reception.

Generally, the user cannot enter the logistics page in the e-commerce client without multiple times of operations. If the user purchases different items via different e-commerce clients, he/she has to additionally switch back and forth between the different e-commerce clients to fetch logistics information of respective item(s).

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a logistics information display method. The method includes acquiring a logistics waybill identifier of at least one item from at least one e-commerce client that is installed on an operating system of a terminal and is configured to display a logistics page; acquiring logistics information corresponding to the logistics waybill identifier, wherein the logistics information indicates a logistics progress of the at least one item; aggregating the acquired logistics information of the at least one item; and displaying the aggregated logistics information in a preset display area provided by the operating system.

When acquiring the logistics waybill identifier, the method includes acquiring first attribute information of an activity currently running in a foreground; determining from the first attribute information that a foreground user interface is the logistics page of the e-commerce client; and reading the logistics waybill identifier from the activity when determining that the foreground user interface is the logistics page of the e-commerce client.

Wherein acquiring the logistics waybill identifier, the method includes acquiring first attribute information of an activity currently running in a foreground; determining from the first attribute information that a foreground user interface is the logistics page of the e-commerce client; calling a screenshot interface in the operating system when determining that the foreground user interface is the logistics page of the e-commerce client; acquiring a page image corresponding to the logistics page through the screenshot interface; and identifying the logistics waybill identifier from the page image.

The method also includes acquiring second attribute information of a currently started main activity, wherein a client identifier included in the second attribute information is different from a client identifier of another started activity; determining from the second attribute information that a client to which the currently started main activity belongs is the e-commerce client; outputting inquiry information when determining that the client is the e-commerce client, wherein the inquiry information is used to determine if the operating system is permitted to acquire the logistics waybill identifier in the logistics page of the e-commerce client; and receiving a confirmation operation for the inquiry information, wherein the confirmation operation is configured to trigger the operating system to acquire the logistics waybill identifier in the logistics page of the e-commerce client.

When acquiring the logistics information, the method includes calling a logistics query interface in the operating system; and inquiring the logistics information through the logistics query interface in the operating system.

The logistics information includes an overall logistics progress including at least one of being in transit, having been shipped, having difficulty in delivery, having been signed after reception, having been signed out, being in distribution and being returned. When aggregating and displaying the acquired logistics information, the method includes determining a priority level corresponding to the logistics information based on a preset corresponding relationship including a corresponding relationship between the overall logistics progress and the priority level; determining a corresponding target display position of the logistics information in the preset display area based on the priority level, wherein at least two display positions in the preset display area are ranked in a descending order based on priority levels; and displaying the logistics information at the corresponding target display position.

The method also includes deleting the logistics information from the preset display area when the overall logistics progress in the logistics information is one of having been shipped, having been signed after reception, having difficulty in delivery, and having been signed out and being returned, and wherein a time length for displaying the logistics information in an aggregated manner reaches a preset time length threshold.

The method also includes outputting a prompting message when a logistics information aggregation function is not enabled, wherein the prompting message is configured to prompt a user to enable a logistics information aggregation function, wherein the logistics information aggregation function is a function of aggregating the logistics information into the preset display area and displaying the aggregated logistics information; receiving a start operation acting on the prompting message; and enabling the logistics information aggregation function when the start operation is received.

The method also includes receiving a viewing operation acting on an outputted prompting message, or receiving a viewing operation acting on an application to which a logistics information aggregation function belongs, wherein the logistics information aggregation function is a function of aggregating the logistics information into the preset display area and displaying the aggregated logistics information; displaying a setting page based on the viewing operation, wherein the setting page is configured to enable or disable the logistics information aggregation function; receiving a start operation acting on the setting page; and enabling the logistics information aggregation function when the start operation is received.

Aspects of the disclosure also provide a logistics information display device including a processor and a memory configured to store executable instructions executed by the processor. The processor is configured to acquire a logistics waybill identifier of at least one item from at least one e-commerce client that is installed on an operating system of a terminal and is configured to display a logistics page; acquire logistics information corresponding to the logistics waybill identifier, wherein the logistics information indicates a logistics progress of the at least one item; aggregate the acquired logistics information of the at least one item; and display the aggregated logistics information in a preset display area provided by the operating system.

The processor is also configured to acquire first attribute information of an activity currently running in a foreground; determine from the first attribute information that a foreground user interface is the logistics page of the e-commerce client; and read the logistics waybill identifier from the activity when determining from that the foreground user interface is the logistics page of the e-commerce client.

The processor is also configured to acquire first attribute information of an activity currently running in a foreground; determine from the first attribute information that a foreground user interface is the logistics page of the e-commerce client; call a screenshot interface in the operating system when determining that the foreground user interface is the logistics page of the e-commerce client; acquire a page image corresponding to the logistics page through the screenshot interface; and identify the logistics waybill identifier from the page image.

The processor is also configured to acquire second attribute information of a currently started main activity, wherein a client identifier included in the second attribute information is different from a client identifier of another started activity; determine from the second attribute information that a client to which the currently started main activity belongs is the e-commerce client; output inquiry information when determining that the client is the e-commerce client, wherein the inquiry information is used to determine if the operating system is permitted to acquire the logistics waybill identifier in the logistics page of the e-commerce client; and receive a confirmation operation for the inquiry information, wherein the confirmation operation is configured to trigger the operating system to acquire the logistics waybill identifier in the logistics page of the e-commerce client.

The processor is also configured to call a logistics query interface in the operating system; and inquire the logistics information through the logistics query interface in the operating system.

The logistics information includes an overall logistics progress including at least one of being in transit, having been shipped, having difficulty in delivery, having been signed after reception, having been signed out, being in distribution and being returned. The processor is also configured to determine a priority level corresponding to the logistics information based on a preset corresponding relationship including a corresponding relationship between the overall logistics progress and the priority level; determine a corresponding target display position of the logistics information in the preset display area based on the priority level, wherein at least two display positions in the preset display area are ranked in a descending order based on priority levels; and display the logistics information at the corresponding target display position.

The processor is also configured to delete the logistics information from the preset display area when the overall logistics progress in the logistics information is one of having been shipped, having been signed after reception, having difficulty in delivery, and having been signed out and being returned, and wherein a time length for displaying the logistics information in an aggregated manner reaches a preset time length threshold.

The processor is also configured to output a prompting message when the logistics information aggregation function is not enabled, wherein the prompting message is configured to prompt a user to enable a logistics information aggregation function, and wherein the logistics information aggregation function is a function of aggregating the logistics information into the preset display area and displaying the aggregated logistics information; receiving a start operation acting on the prompting message; and enable the logistics information aggregation function when the start operation is received.

The processor is also configured to receive a viewing operation acting on an outputted prompting message, or receive a viewing operation acting on an application to which a logistics information aggregation function belongs, wherein the logistics information aggregation function is a function of aggregating the logistics information into the preset display area and displaying the aggregated logistics information; display a setting page based on the viewing operation received by the second receiving module, wherein the setting page is configured to enable or disable the logistics information aggregation function; receiving a start operation acting on the setting page; and enable the logistics information aggregation function when the start operation displayed by the page display module is received.

Aspects of the disclosure also provide a computer readable storage medium, storing instructions that, when executed by one or more processors of a terminal, cause the terminal to acquire a logistics waybill identifier of at least one item from at least one e-commerce client that is installed on an operating system of the terminal and is configured to display a logistics page; acquire logistics information corresponding to the logistics waybill identifier, wherein the logistics information indicates a logistics progress of the at least one item; aggregate the acquired logistics information of the at least one item; and display the aggregated logistics information in a preset display area provided by the operating system.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

Figure 1:
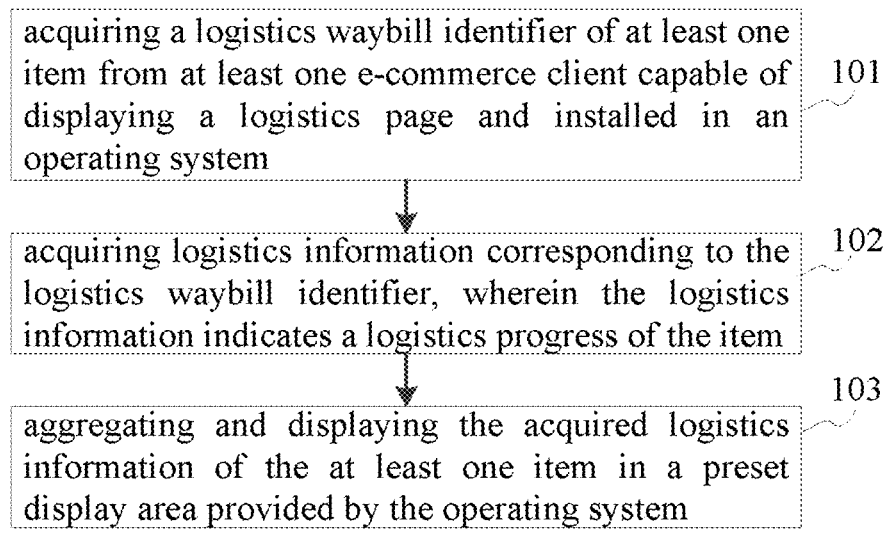
FIG. 1 is a flow chart of a logistics information display method, according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of devices and methods consistent with aspects related to the disclosure as recited in the appended claims.

To understand the logistics display method provided by the present disclosure more clearly, at least one of nouns relating to the present disclosure is briefly introduced first.

1. Logistics information is used to indicate a logistics progress of an item, and at least includes an overall logistics progress for reflecting an approximate progress of the item. The overall logistics progress usually includes at least one of being on the way, having been shipped, having difficulty in delivery, having been signed after reception, having been signed out, being in distribution and being returned. Here, "being on the way" means that the item is being transported; "having been shipped" means that that item has been received by a logistics company and a first piece of logistics information is generated; "having difficulty in delivery" means that there is a problem in a delivery process of the item, for example, the item being rejected by a recipient, a delivery address of the item being wrong, failing to contact the recipient, and the like; "having been signed after reception" means that the recipient receives the item and signs; "having been signed out" means the item is returned to a shipper as the recipient rejects the item or the item is not within a delivery range, and has been signed by the shipper; "being in distribution" means that the item is being in distribution by a logistic sender in a recipient's city; and "being returned" means that the item is being returned to the shipper. In some aspects, the logistics information also includes a detailed logistics progress. The detailed logistics progress is used to reflect a detailed progress of the item. When the overall logistics progress displays that the item is on the way, the detailed logistics progress usually includes at least one of an arrival point and time of arrival for the item, a departure point and time of departure for the item, and a next arrival point of the item. When the overall logistics progress displays that the item is being in distribution, the detailed logistics progress usually includes at least one of a starting point, a delivery time, the name of a sender, and a contact information of the sender.

2. A logistics page is a user interface for displaying the logistics information of the item. In aspects of the present disclosure, all of user interfaces containing the logistics information are logistics pages. For example, a page showing not only a purchase order but also the logistics information is a logistics page; for another example, a page only showing the logistics information is a logistics page. In addition, the logistics page may be a web page provided by a browser, or a page provided by a client. The aspects of the present disclosure do not limit thereto.

3. An e-commerce client refers to an application client or a web client that uses electronic transactions to achieve item purchasing and selling services, and may provide the logistics page.

In some aspects of the present disclosure, "logistics" referred to in the present disclosure is also referred to as "express" in some scenarios, and the aspects of the present disclosure do not limit thereto.

In the related art, a terminal displays logistics information in a logistics page provided by an e-commerce client. When a user purchases several items through multiple e-commerce clients, he/she needs to open the corresponding e-commerce clients separately to view the logistics information of the items. As the terminal needs to switch back and forth between the different e-commerce clients, a resource of the terminal is wasted and the efficiency that the user views the logistics information is reduced. For example, if the user purchases an item A through an e-commerce client A, and purchases an item B through an e-commerce client B, when he/she needs to view the logistics information of the items A and B, the terminal needs to display a logistics page of the e-commerce client A first, and then exits the logistics page of the e-commerce client A to display a logistics page of the e-commerce client B.

In order to save the resource of the terminal during displaying logistics information of an item, there is provided another logistics information display method in the related art. The method includes: sending a logistics waybill identifier of a first item to a shared server after the first item is purchased through a first e-commerce client, and sending a logistics waybill identifier of a second item to the shared server after the second item is purchased through a second e-commerce client, wherein the first and second e-commerce clients correspond to the same shared server and the same account for logging in the shared sever; inquiring by the shared sever the logistics information of the first item in accordance with the logistics waybill identifier of the first item and the logistics information of the second item in accordance with the logistics waybill identifier of the second item; and sending the logistics information of the first and second items to a payment client corresponding to the server account, and displaying by the payment client the logistics information of the first and second items.

In accordance with the above method, it is known that in the related art, the acquired logistics information is shared to the payment client based on a data sharing principle. In order to ensure user data security, generally, sharing user data generated by clients developed by different companies is unlikely. Therefore, the logistics information display method provided by the related art is only applicable to share logistics information generated by different e-commerce clients developed by the same company to the payment client developed by this company. For example, Alibaba shares the logistics information generated by a Taobao client and a Tmall client to an Alipay client. The logistics information display method provided by the related art is narrower in an applicable range. With respect to the e-commerce clients developed by different companies, a user still has to open different e-commerce clients separately to view the logistics information of items, such that an effect of saving a terminal resource is relatively poor. Based on this, the aspects of the present disclosure provide a logistics information display method and a device thereof to solve problems in the related art. The technical solutions provided by the aspects of the present disclosure are as follows. A logistics waybill identifier in a logistics page is acquired when the logistics page of an e-commerce client is displayed; and logistics information of an item is inquired through a logistics query interface in accordance with the logistics waybill identifier, and is displayed in a preset display area provided by an operating system. As the operating system may acquire the logistics waybill identifiers in the logistics pages of different e-commerce clients, and display the logistics information corresponding to the different logistics waybill identifiers in the same display area, displaying the logistics information of the different e-commerce clients in the same display area is realized. In this way, the terminal allows the user to view the logistics information without switching user interfaces back and forth, so that not only the resource of the terminal is saved, but also the efficiency that the user views the logistics information is improved.

In some aspects, in the logistics information display method provided by the aspects of the present disclosure, a terminal is taken as an executive subject in each step to describe the present disclosure. The terminal may be implemented as a mobile phone, a computer, a wearable device, a tablet computer or the like. The aspects of the present disclosure do not limit thereto.

FIG. 1 is a flow chart of a logistics information display method shown in accordance with an exemplary aspect. The method may include the following steps.

At step 101, a logistics waybill identifier of at least one item is acquired from at least one e-commerce client capable of displaying a logistics page and installed in an operating system.

At step 102, logistics information corresponding to the logistics waybill identifier is acquired, which indicates a logistics progress of the item.

At step 103, the acquired logistics information of the at least one item is aggregated and displayed in a preset display area provided by the operating system.

In summary, with the logistics information display method provided by the present aspect, the logistics waybill identifier in the at least one e-commerce client is acquired, and the logistics information corresponding to each logistics waybill identifier is aggregated and displayed in the preset display area provided by the operating system, so that the terminal allows the user to view the logistics information of the items in the at least one e-commerce client without switching user interfaces back and forth, which can solve the problems that the consumption of the resource of the terminal is excessive, and the efficiency that the user views the logistics information is lower when the terminal switches user interfaces back and forth for displaying the logistics information in the at least one e-commerce client. As the terminal aggregates and displays the logistics information in the different e-commerce clients in the same preset display area, the resource of the terminal is saved, and the efficiency that the user views the logistics information is improved.

Figure 2:
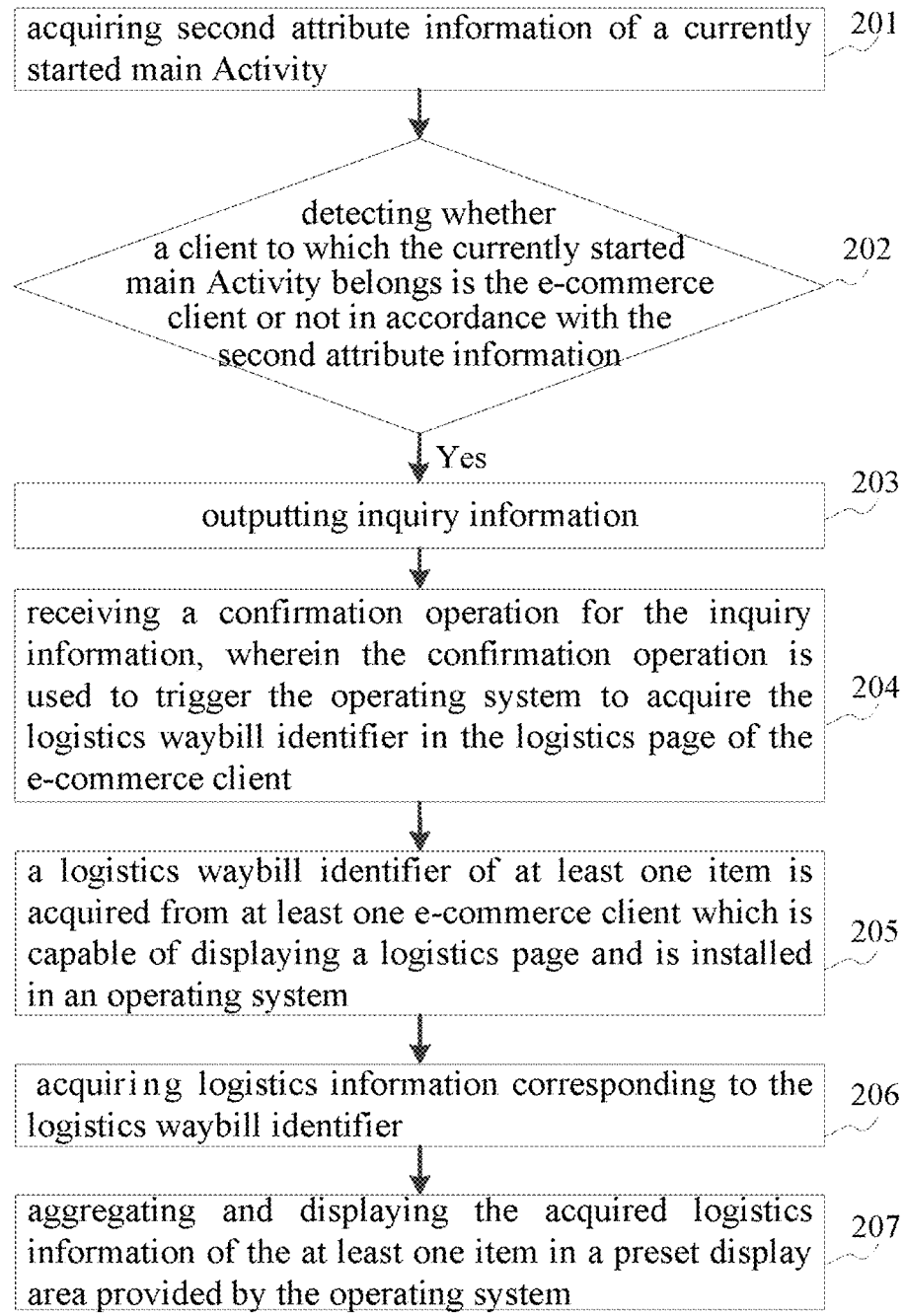
FIG. 2 is a flow chart of a logistics information display method, according to another exemplary aspect of the present disclosure.

FIG. 2 is a flow chart of a logistics information display method shown in accordance with an exemplary aspect. The method may include the following steps.

At step 201, second attribute information of a currently started main Activity is acquired.

Each client includes at least one Activity, wherein the Activity is a component that provides a user interface and is used to allow a user and a terminal to interact with each other.

When a client is started, the main Activity of the client is started first. Wherein, the main Activity is one of at least one Activity included in the client, and is used to provide a user interface displayed first when the client is started, such as a video list interface displayed first when a video client is started, a search interface displayed first when a browser client is started, and a song recommended interface displayed first when a music client is started. In some aspects, the main Activity is also referred to as a default Activity. The present aspect does not limit the name of the main Activity.

The second attribute information of the main Activity is used to instruct an attribute of a user interface currently displayed by the terminal, and at least includes a client identifier of a client to which the main Activity belongs, wherein the client identifier may be a name of package of the client, a client name, icon information of the client, or the like, and the present aspect does not limit thereto. As the main Activity of the client is started first when the client is started, another client to which another main Activity belongs has been started by the operating system and is different from the client to which the main Activity belongs. That is, the client identifier included in the second attribute information is different from a client identifier of another started Activity.

At step 202, whether the client to which the currently started main Activity belongs is an e-commerce client or not is detected in accordance with the second attribute information.

As the second attribute information includes the client identifier, the terminal can detect whether the client to which the currently started main Activity belongs is an e-commerce client or not in accordance with whether the client identifier being a client identifier of the e-commerce client.

Manners through which the terminal can detect whether the client that the currently started main Activity belongs to is the e-commerce client or not include, but are not limited to the following implementations.

In a first implementation, the terminal searches corresponding client information in accordance with the client identifier in the second attribute information, the client information including the type of the client; whether the type of the client is an e-commerce client or not is detected; it is determined that the client to which the main Activity belongs is the e-commerce client when the type of the client is the e-commerce client, and step 203 is executed; or it is determined that the client to which the main Activity belongs is not the e-commerce client when the type of the client is not the e-commerce client, and step 201 is executed again.

In a second implementation, the terminal acquires a whitelist file including a client identifier of at least one e-commerce client; whether the whitelist file includes a client identifier in the second attribute information or not is inquired; when the whitelist file includes the client identifier in the second attribute information, it is determined that the client to which the main Activity belongs is the e-commerce client and step 203 is executed; or when the whitelist file does not include the client identifier in the second attribute information, it is determined that the client to which the main Activity belongs is not the e-commerce client and step 201 is executed again. Wherein, the whitelist file may be set by the user or may be sent by a server, and the present aspect does not limit thereto.

At step 203, inquiry information is output.

In the present aspect, the inquiry information is output when the e-commerce client is started. The inquiry information is used to inquire whether it is allowed to acquire the logistics waybill identifier in the logistics page of the e-commerce client. In this way, the terminal cannot acquire the logistics waybill identifier until the user allows the terminal to acquire the logistics waybill identifier in the logistics page of the e-commerce client, such that the user data security in the e-commerce client is ensured.

Here, the inquiry information may be text information or voice information. When the inquiry information is the text information, it may be displayed above a user interface provided by the main Activity in a form of a floating window. Alternatively, the inquiry information can be displayed above a user interface provided by the main Activity in a form of a user interface. Schematically, the inquiry information can be displayed on top of a user interface provided by the main Activity in a form of a floating window, or the inquiry information can be displayed in a user interface which is above a user interface provided by the main Activity. In the present aspect, forms, display forms and display positions of the inquiry information are not limited.

Figure 3:
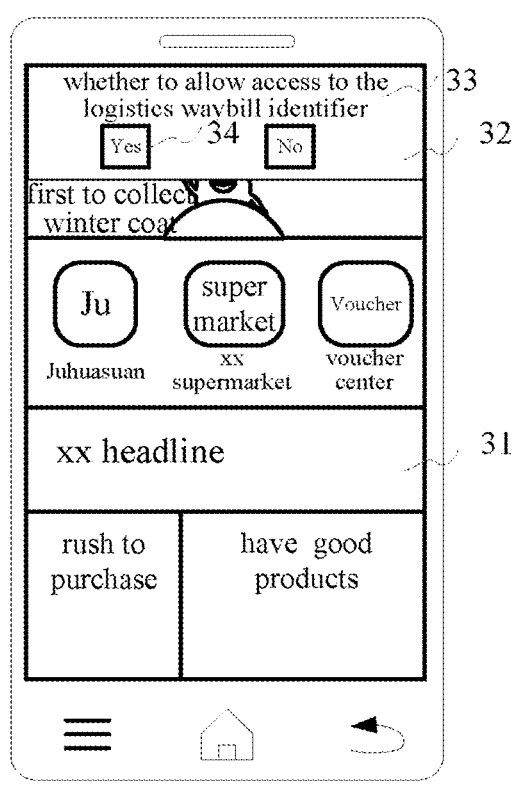
FIG. 3 is a schematic view of a terminal outputting inquiry information, according to an exemplary aspect of the present disclosure.

Referring to FIG. 3, there is shown a schematic view when the terminal outputs the inquiry information. As shown in FIG. 3, when the e-commerce client is started, a floating window 32 covers a user interface 31 provided by the main Activity, and inquiry information 33 is displayed in the floating window 32.

In some aspects, in order to avoid a waste of the resource of the terminal arising from the fact that the terminal outputs the inquiry information every time when the e-commerce client is started, the terminal may output the inquiry information only when the e-commerce client is started for the first time; or the terminal may output the inquiry information when the e-commerce client is started every a preset number of times. Alternatively, the terminal can output the inquiry information when a time length between a time point when the inquiry information is output last time and a time point when the e-commerce client is current started reaches a preset time length. The present aspect does not limit thereto.

For example, the terminal outputs the inquiry information when the e-commerce client is started for the first time, and outputs the inquiry information when the e-commerce client is started every other time. That is, the terminal outputs the inquiry information when the e-commerce is started for the third time, for the fifth time, for the seventh time and so forth.

At step 204, a confirmation operation for the inquiry information is received. The confirmation operation triggers the operating system to acquire the logistics waybill identifier in the logistics page of the e-commerce client.

When the inquiry information is in the form of a text, the confirmation operation for the inquiry information may be a clicking operation or a sliding operation acting on the inquiry information, or an operation of clicking a confirmation option set in a display area of the inquiry information, for example, an operation of clicking a "Yes" option 34 shown in FIG. 3. The present aspect does not limit thereto.

When the inquiry information is in the form of a voice, the confirmation operation for the inquiry information may be an operation of receiving a user input voice message.

In some aspects, the terminal may not execute steps 201-204 but execute step 205 directly. Here, the terminal directly reads the logistics waybill identifier in the logistics page of the e-commerce client without acquiring a permission of the user, thereby saving the terminal resource.

At step 205, a logistics waybill identifier of at least one item is acquired from at least one e-commerce client which is capable of displaying a logistics page and is installed in an operating system.

In the present aspect, the terminal may acquire logistics information corresponding to each logistics waybill identifier by acquiring the logistics waybill identifier of the item in each e-commerce client, such that when the logistics information corresponding to each logistics waybill identifier is displayed in a preset display area provided by the operating system, a user may view the logistics information in all of the e-commerce clients without switching user interfaces back and forth, saving the resource of the terminal. Here, the logistics waybill identifier is used to indicate the logistics information of the item, and may be a logistics waybill number, a logistics waybill label or the name of a logistics company, and the present aspect does not limit thereto.

Manners through which the terminal acquires the logistics waybill identifier of at least one item from the e-commerce client include, but are not limited to the following implementations.

In one implementation, the terminal acquires first attribute information of an Activity currently running in a foreground; whether a foreground user interface is the logistics page of the e-commerce client or not is detected in accordance with the first attribute information of the Activity; and the logistics waybill identifier is read from the Activity when determining from the first attribute information that the foreground user interface is the logistics page of the e-commerce client.

As the first attribute information includes a client identifier identifying a client to which the Activity belongs, and an interface identifier identifying a user interface provided by the Activity, the terminal can detect whether the foreground user interface is the logistics page of the e-commerce client or not in accordance with the first attribute information. Wherein, the interface identifier may be a class name of the user interface, and the present aspect does not limit thereto.

Detecting by the terminal whether the foreground user interface is the logistics page of the e-commerce client or not in accordance with the first attribute information includes: the terminal acquires a preset file including a client identifier of at least one e-commerce client and a page identifier of a logistics page corresponding to the client identifier; whether the preset file includes the client identifier in the first attribute information and the page identifier corresponding to the client identifier or not is detected; it is determined that the foreground user interface is the logistics page of the e-commerce client when the preset file includes the client identifier in the first attribute information and the page identifier corresponding to the client identifier; or it is determined that the foreground user interface is not the logistics page of the e-commerce client when the preset file does not include the client identifier in the first attribute information and does not include the page identifier corresponding to the client identifier.

The Activity running in the foreground includes all data included in the foreground user interface. When the terminal determines that the foreground user interface is the logistics page of the e-commerce client, the logistics waybill identifier included in the foreground user interface may be acquired from the Activity running in the foreground.

In another implementation, the terminal acquires the first attribute information of the Activity currently running in the foreground; whether the foreground user interface is the logistics page of the e-commerce client or not is detected in accordance with the first attribute information of the Activity; a screenshot interface in the operating system is called when determining from the first attribute information that the foreground user interface is the logistics page of the e-commerce client; a page image corresponding to the logistics page is acquired through the screenshot interface; and the logistics waybill identifier is recognized from the page image.

Here, the screenshot interface in the operating system is used to capture the image of the foreground user interface, and may be a DirectX interface, a mirror driver interface, or a bit_block conversion interface, and the present aspect does not limit thereto. When the user interface currently running in the foreground is the logistics page, the page image of the logistics page may be acquired through the screenshot interface; and the logistics waybill identifier in the page image may be acquired by recognizing the page image. A recognizing manner of the terminal to the page image may be statistical pattern recognition, structural pattern recognition, or fuzzy pattern recognition, and the present aspect does not limit thereto.

In some aspects, when the terminal determines whether to acquire the logistics waybill identifier in the logistics page of the e-commerce client or not in accordance with the confirmation operation input by the user, the at least one e-commerce client capable of displaying the logistics page at this step is the e-commerce client that receives the confirmation operation input by the user.

At step 206, logistics information corresponding to the logistics waybill identifier is acquired.

The logistics information is used to indicate a logistics progress of an item. Manners through which the terminal acquires the logistics information corresponding to a logistics waybill identifier include, but are not limited to the following implementations.

In one implementation, the terminal calls a logistics query interface in the operating system; and the logistics information is inquired through the logistics query interface in the operating system. Wherein, the logistics query interface in the operating system is preset in the operating system and is used to inquire the corresponding logistics information in accordance with a logistics order identifier.

In another implementation, the terminal calls a logistics query interface in a third party application; and the logistics information is inquired through the logistics query interface in the third party application. The third party application has a logistics information query function, and may be a client developed by kuaidi 100 which is a website for express, an e-commerce client or a logistics company, and the present aspect does not limit thereto. Wherein, the logistics query interface in the third party application is preset in the third party application and is used to inquire corresponding logistics information in accordance with the logistics order identifier, such as a kuaidi 100 interface in the kuaidi 100.

At step 207, the acquired logistics information of the at least one item is aggregated and displayed in a preset display area provided by the operating system.

Figure 4:
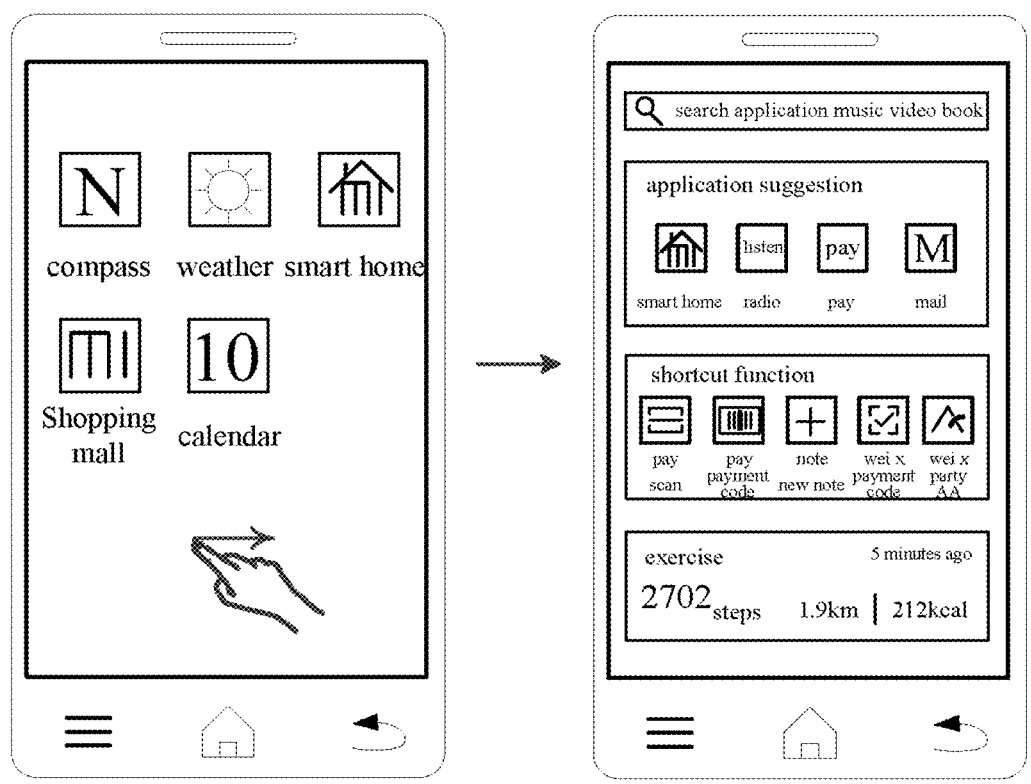
FIG. 4 is a schematic view of a terminal switching to a hiboard, according to an exemplary aspect of the present disclosure.

Here, the preset display area is an area for a desktop widget (also known as a desktop bookmark), or a predetermined area in a notification bar. The desktop widget is usually set in a hiboard of the terminal. The hiboard is different from a desktop used to display an application icon in the terminal, and is usually used to provide data information to which the user subscribes, such as a schedule, motion monitoring, a movie, music and other information. The hiboard is usually set on a next page of a predetermined page of the terminal. When the user slides rightwards on the predetermined page, the predetermined page is switched to the hiboard. Please referring to FIG. 4, a schematic view of switching from the predetermined page to the hiboard shown is illustrated. Here, the predetermined page may be a main screen of the terminal or the notification bar of the terminal, and the present aspect does not limit thereto. Of course, there may be other setting means for the hiboard, and the present aspect does not limit thereto.

Figure 5:
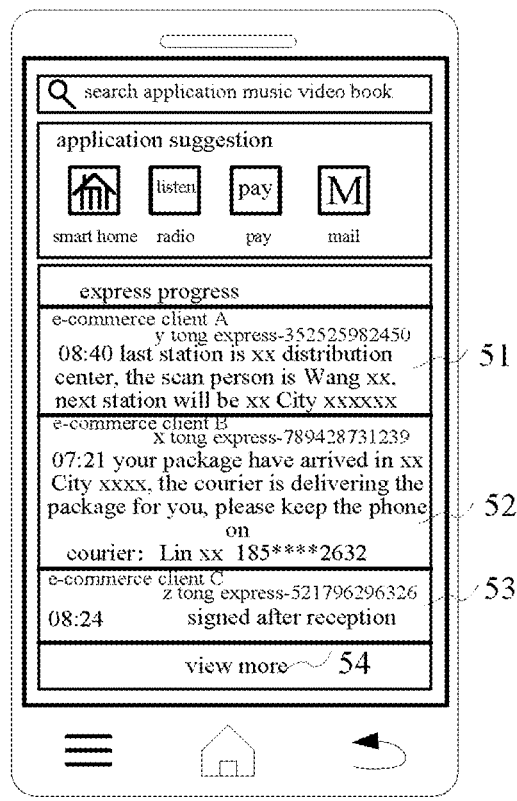
FIG. 5 is a schematic view of a terminal displaying logistics information using a desktop widget, according to an exemplary aspect of the present disclosure.

Referring to FIG. 5, there is shown a schematic view of aggregating logistics information of at least one item into a desktop widget and displaying the aggregated logistics information. In FIG. 5, logistics information 51 is logistics information of an item purchased in an e-commerce client A; logistics information 52 is logistics information of an item purchased in an e-commerce client B; and logistics information 53 is logistics information of an item purchased in an e-commerce client C. As shown in FIG. 5, when a user needs to view the logistics information 51, 52 and 53, he/she only needs to view the logistics information in the desktop widget, without opening the e-commerce clients A, B and C, respectively, thereby improving the efficiency that the user views the logistics information.

Figure 6:
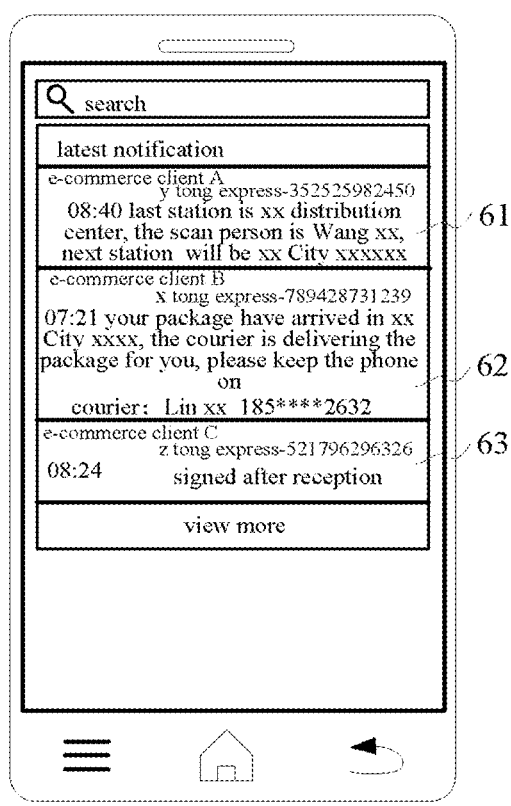
FIG. 6 is a schematic view of a terminal displaying logistics information in a notification bar, according to an exemplary aspect of the present disclosure.

The notification bar is used to display a notification message received by the terminal, and may be implemented as a pull-down menu, a pull-up menu, or the like in the terminal, and the present aspect does not limit thereto. Referring to FIG. 6, there is shown a schematic view of aggregating logistics information of at least one item into the notification bar and displaying the aggregated logistics information. In FIG. 6, logistics information 61 is logistics information of an item purchased in the e-commerce client A; logistics information 62 is logistics information of an item purchased in the e-commerce client B; and logistics information 63 is logistics information of an item purchased in the e-commerce client C.

In some aspects, the terminal may display progress of each piece of logistics information in the preset display area. In order to save the space of the preset display area, the terminal may also display the latest progress of each piece of the logistics information in the preset display area, such as the logistics information 51, 52 and 53 shown in FIG. 5.

Figure 7:
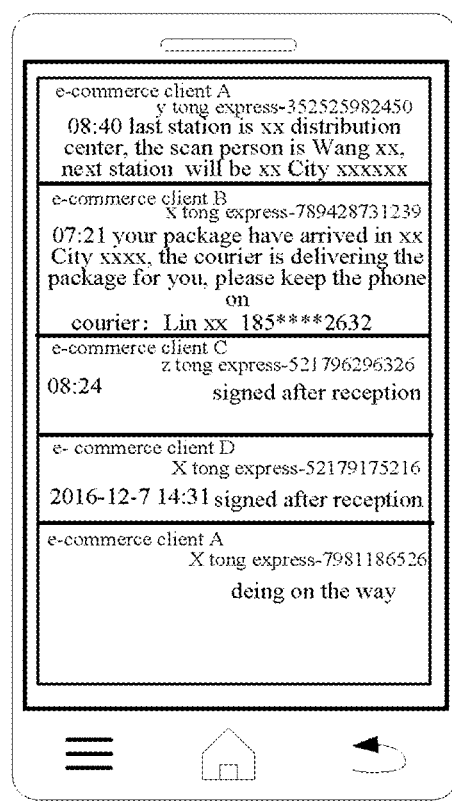
FIG. 7 is a schematic view of a terminal displaying logistics information, according to an exemplary aspect of the present disclosure.

In some aspects, when the number of items purchased in at least one e-commerce client is large, the terminal may display a preset number of pieces of logistics information in the preset display area, such as three pieces of logistics information, and provides a progress bar in the preset display area. The progress bar is used to be slid by the user to view more logistics information. Or, the terminal sets an option of viewing more logistics information in the preset display area, such as a "View More" option 54 shown in FIG. 5. When receiving an operation acting on the option of viewing more logistics information, the terminal jumps to a page for displaying all pieces of logistics information, such as a page shown in FIG. 7, the page allowing the user to view all pieces of logistics information. In some aspects, when receiving the operation acting on the option of viewing more logistics information, the page shown by the terminal after a jump operation may only display logistics information not shown in the preset display area.

In some aspects, when the number of items purchased in at least one e-commerce client is large, there may be a number of pieces of logistics information displayed in the preset display area. In order to enable the terminal to preferentially display logistics information that the user needs to view, and further reduce operations required to be executed by the user when he/she views the logistics information, the terminal may rank all pieces of the logistics information. Here, the terminal aggregating and displaying the acquired logistics information of the at least one item in the preset display area provided by the operating system includes: determining a priority level corresponding to the logistics information in accordance with a preset corresponding relationship including a corresponding relationship between the overall logistics progress and the priority level; determining a corresponding target display position of the logistics information in the preset display area in accordance with the priority level, at least two display positions in the preset display area being ranked in a descending order according to their priorities; and displaying the logistics information at the corresponding target display position.

A preset corresponding relationship between all of the overall logistics progresses and the priority level is preset in the terminal, and may be set by the user or sent to the terminal by the server in advance. The present aspect does not limit thereto.

Figure 8:
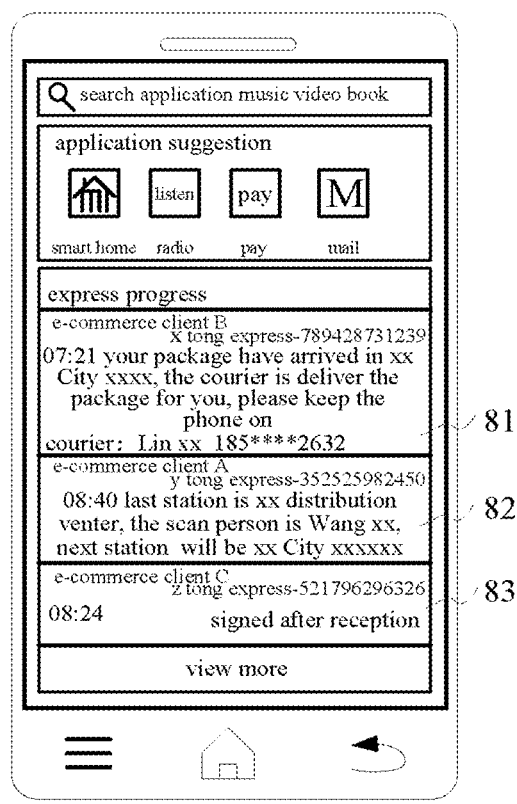
FIG. 8 is a schematic view of a terminal displaying logistics information using a desktop widget, according to another exemplary aspect of the present disclosure.

It is assumed that the preset corresponding relationship between all of the overall logistics progresses and the priority level is shown in Table 1 below. Here, the smaller the value for priority level is, the higher the priority level is. When the terminal acquires the logistics information 51, 52 and 53 shown in FIG. 5, the acquired all pieces of the logistics information in a desktop widget is shown in FIG. 8 after the logistics information is ranked in accordance with the priority level shown in Table 1. As shown in FIG. 8, logistics information 81 of "being in distribution" in the overall logistics progress is shown at the first display position; logistics information 82 of "being on the way" in the overall logistics progress is shown at the second display position; and logistics information 83 of "having been signed after reception" in the overall logistics progress is shown at the third display position.

TABLE 1

| Overall Logistics Progress | Priority level |
| --- | --- |
| Being in Distribution | 0 |
| Having Difficulty in Delivery | 1 |
| Having Been Signed Out | 2 |
| Being Returned | 3 |
| Being On The Way | 4 |
| Having Been Shipped | 5 |
| Having Been Signed After Reception | 6 |

It should be noted that the manner for setting priority level in Table 1 is only taken as an example to illustrate the present aspect. While in practice, other priority level may be set for the overall logistics progress; or, the same priority level may be set for different overall logistics progresses. The present aspect does not limit thereto.

In some aspects, the corresponding target display position for the logistics information in the preset display area can be determined in accordance with the time length between an update time point for the logistics information and the current time point. At least two display positions in the preset display area can be ranked in an ascending order of the time length, and the logistics information can be displayed in the corresponding display position.

In some aspects, in order to allow the user to view an item corresponding to each piece of logistics information, the terminal may display a merchant client, an item name and the like of a purchased item in the preset display area. In order to allow the user to view more detailed information corresponding to each item, the terminal may also display the name of a logistics company, a logistics waybill number, a detailed logistics process and the like in the preset display area. When the terminal displays the detailed logistics progress in the preset display area, as the user usually only needs to know corresponding detailed logistics progresses of "being on the way" and "being in distribution", the terminal may only display the detailed logistics progresses corresponding to the "being on the way" and "being in distribution", thereby saving the space of the preset display area.

In some aspects, in order to enable the user to view a logistics page of an item in an e-commerce client thereof through the preset display area, the terminal may add a client identifier of the e-commerce client and a page identifier of the logistics page of the item into a display position for logistics information of the item in the preset display area. In this case, when receiving a viewing operation which is output by the user and acts on the display position of the logistics information, the terminal starts the e-commerce client corresponding to the client identifier in the display position, and displays the logistics page corresponding to the page identifier in the display position.

In some aspects, when an overall logistics process indicates at least one of having been shipped, having been signed after reception, having difficulty in delivery, having been signed out and being returned, the user generally does not need to repeatedly view logistics information covering above overall logistics progress. Therefore, the terminal may set a preset time length threshold for these overall logistics progresses. When the time length for displaying the logistics information including the overall logistics progress reaches the preset time length threshold, the logistics information is deleted automatically. Here, the terminal may set different preset time length thresholds for different logistics overall progresses, such as, the time threshold set for "having been shipped" being 1 hour, and the time threshold set for "having difficulty in delivery" being 24 hours. Or, different overall logistics progresses may be set with the same preset time length threshold, such as, the time threshold set for "having been shipped" and "having been signed after reception" being 1 hour.

In some aspects, the user may manually delete logistics information that is not required to be viewed in the preset display area. Here, when the terminal receives a deletion operation which is input by the user and acts on logistics information displayed in the preset display area, the corresponding logistics information is deleted in accordance with the deletion operation. Wherein, the deletion operation may be sliding operation, a clicking operation, a long-press operation, or a combination of various operations, and the present aspect does not limit thereto.

Figure 9:
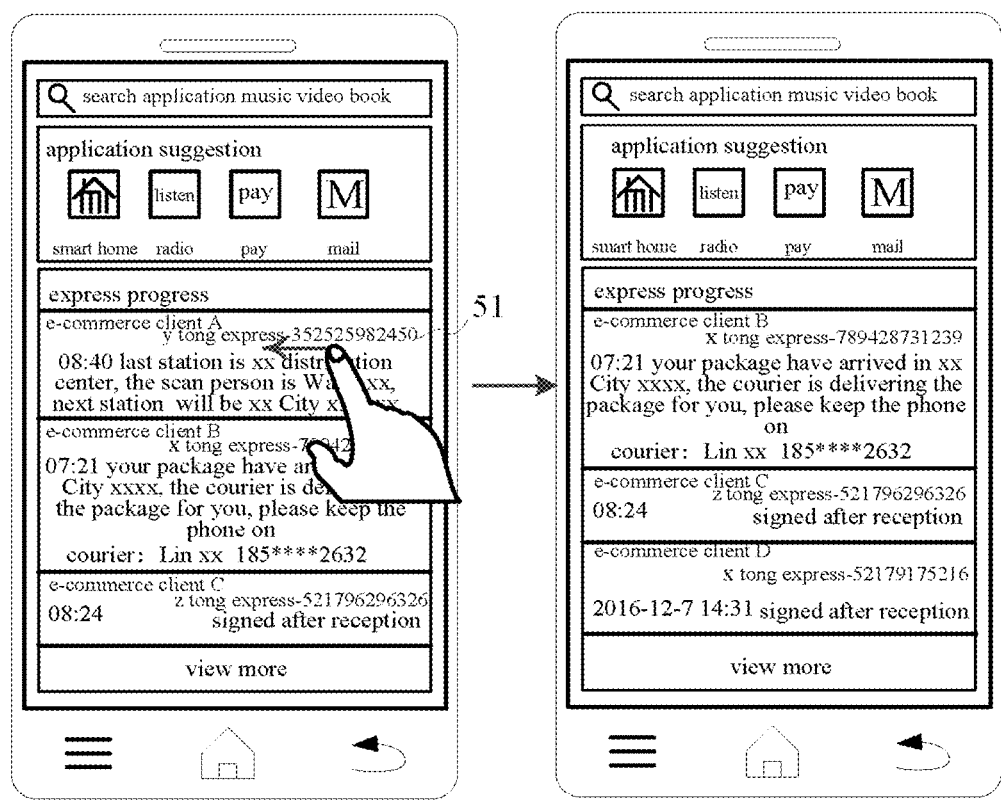
FIG. 9 is a schematic view of a terminal displaying logistics information using a desktop widget, according to another exemplary aspect of the present disclosure.

Assuming that the deletion operation is a leftward sliding operation, the terminal deletes the logistics information 51 when the user executes the leftward sliding operation for the logistics information 51 shown in FIG. 5. Various pieces of logistics information in the preset display area acquired after deletion are shown in FIG. 9.

In summary, with the logistics information display method provided by the aspects of the present disclosure, whether the user allows the terminal to acquire the logistics waybill identifier in the logistics page or not is inquired; and the logistics waybill identifier is acquired from the logistics page under the condition that the user allows the terminal to acquire the logistics waybill identifier, so that the terminal may acquire the logistics waybill identifier flexibly based on a need of the user, ensuring the security of user data in each e-commerce client.

Additionally or alternatively, by sequentially displaying various pieces of logistics information in the preset display area in accordance with a descending order of their priority levels, the terminal may preferentially display logistics information with a high possibility for the user to view. In this way, the user can find the logistics information he/she needs to view without flipping upwards and downwards when there are many pieces of logistics information in the preset display area, so that operations required to be executed by the user when he/she views the logistics information are further reduced, and the efficiency that the user views the logistics information is improved.

Additionally or alternatively, by setting the preset time length thresholds for the overall logistics progresses of having been shipped, having been signed after reception, having difficulty in delivery, having been signed out and being returned, the terminal may automatically delete the logistics information when the time length for displaying the logistics information including any of overall logistics progresses reaches the preset time length threshold, so that the space of the preset display area is saved.

Figure 10:
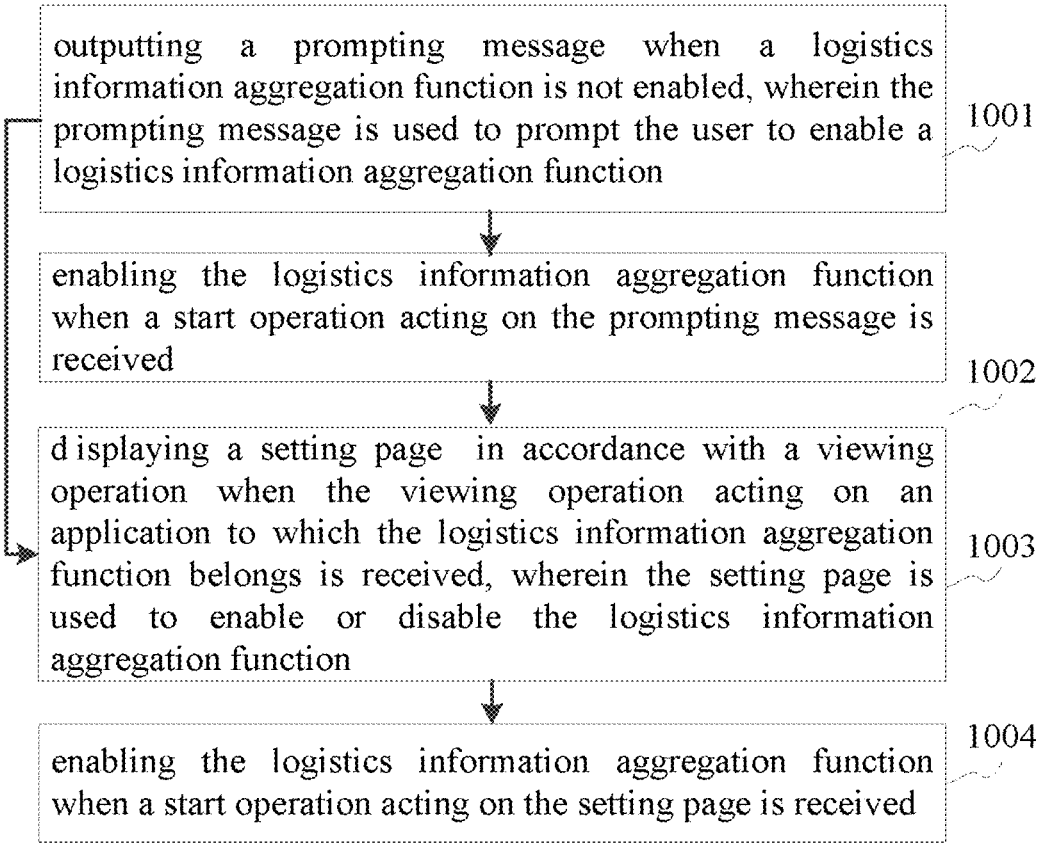
FIG. 10 is a flow chart of a logistics information display method, according to another exemplary aspect of the present disclosure.

In some aspects, step 207 cannot be executed under the condition that the terminal does not starts a logistics information aggregation function. Therefore, before step 207, the terminal will prompt the user to start the logistics information aggregation function when the terminal does not start the logistics information aggregation function. Here, the logistics information aggregation function refers to a function of aggregating logistics information in the preset display area and displaying the aggregated logistics information. FIG. 10 is a flow chart of a logistics information display method shown in accordance with another exemplary aspect, and the logistics information display method further includes the following steps.

At step 1001, under the condition that the logistics information aggregation function is not started, a prompting message is output and prompts the user to start the logistics information aggregation function.

The terminal may output the prompting message when it is determined that the currently started client is an e-commerce client. Or, the prompting message is output when it is determined that the current user interface is a logistics page. Or, the prompting message is output when a logistics waybill identifier is acquired. Or, the prompting message may be output at a certain time interval. The present aspect does not limit a time when the terminal outputs the prompting message. An example in which the terminal outputs the prompting message when it is determined that the current user interface is the logistics page is taken to illustrate hereinafter.

The prompting message may be in the form of a text or a voice, and the present aspect does not limit thereto. When the prompting message is in the form of the text, the terminal may output the prompting message with a floating window covering the current user interface; or, the prompting message may be displayed in the notification bar. The present aspect does not limit thereto.

Figure 11:
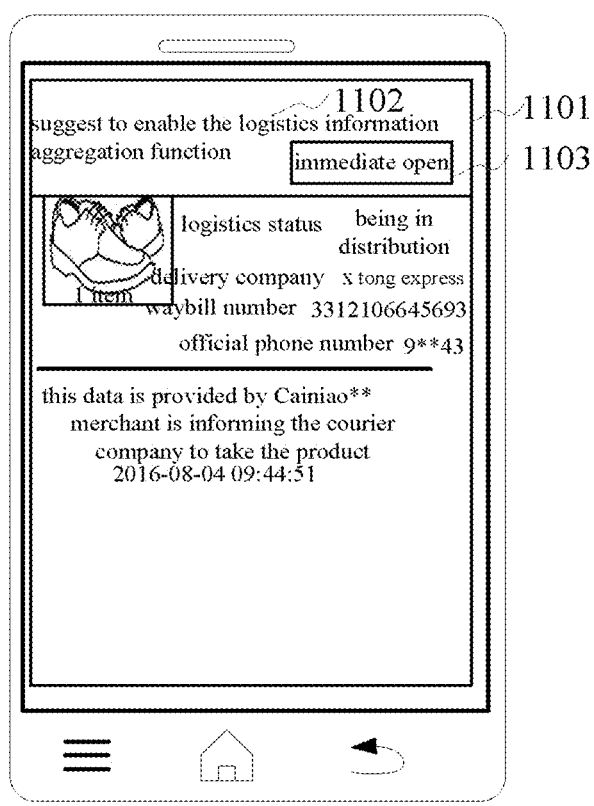
FIG. 11 is a schematic view of a terminal outputting a prompting message, according to an exemplary aspect of the present disclosure.

Referring to FIG. 11, there is shown a schematic view of the terminal at the time of outputting a prompting message. As shown in FIG. 11, the terminal outputs prompting message 1102 in the form of a floating window 1101 when it is determined that the current user interface is a logistics page; and the floating window 1101 is displayed at the top of the logistics page.

Figure 12:
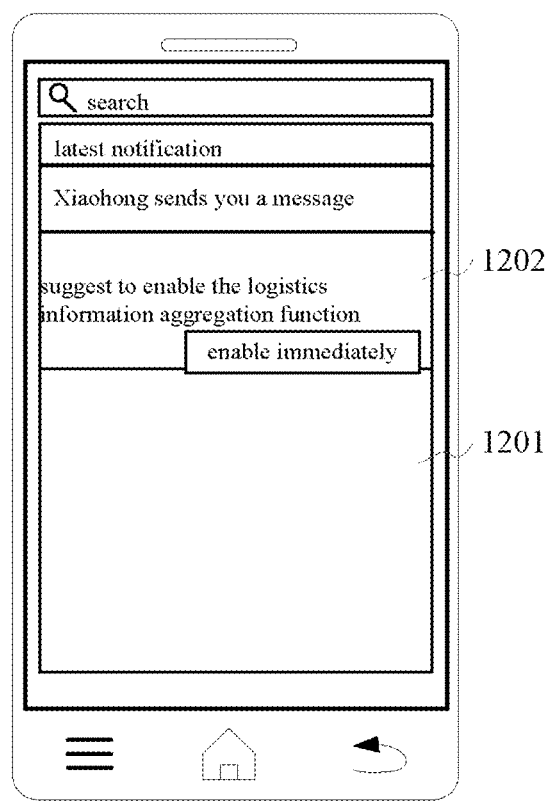
FIG. 12 is a schematic view of a terminal outputting a prompting message, according to another exemplary aspect of the present disclosure.

Referring to FIG. 12, there is shown another schematic view of the terminal at the time of outputting a prompting message. As shown in FIG. 12, the terminal displays prompting message 1202 in a notification bar 1201.

In some aspects, in order to avoid the waste of the resource of the terminal arising from the fact that the terminal outputs a prompting message every time when it is determined that the current user interface is the logistics page, following implementations are adopted. In one implementation, the terminal acquires from output records a historical time at which time the last prompting message is output; whether a time difference between the historical time and the current time reaches a preset time length is detected; and the prompting message is output when the time difference reaches the preset time length. When the time difference between the historical time and the current time reaches the preset time length, it means that the terminal does not output the prompting message within the preset time length; and in order to remind the user whether to start the logistics information aggregation function, the terminal outputs the prompting message again.

In another implementation, the terminal acquires from output records a historical time at which time the last prompting message is output; whether a time difference between the historical time and the current time reaches a preset time length is detected; when the time difference reaches the preset time length, whether the number of times of outputting the prompting message reaches a preset number of times is detected; and when the number of times does not reach the preset number of times, the prompting message is output. When the time difference between the historical time and the current time reaches the preset time length, and the number of times of outputting the prompting message reaches the preset number of times, it means that the probability that the user does not need to start the logistics information aggregation function is higher. Here, the prompting message is not output. When the number of times of outputting the prompting message does not reach the preset number of times, it means that the user may also need to start the logistics information aggregation function. Here, the prompting message is output again to remind the user to start the logistics information aggregation function.

In some aspects, after the terminal outputs the prompting message, in order to ensure the accuracy of whether or not outputting the prompting message in a next detection, it is also necessary to record this event of outputting the prompting message into the output records.

In some aspects, before this step, the terminal also needs to detect whether the logistics information aggregation function has been started. When the terminal detects whether the logistics information aggregation function has been started, it may be implemented by detecting whether an identifier corresponding to the logistics information aggregation function is a start identifier or not; if yes, it means that the logistics information aggregation function has been started; or if not, it means that the logistics information aggregation function has not been started. It should be noted that once the terminal starts the logistics information aggregation function, it will no longer display the prompting message.

In some aspects, step 1002 or step 1003 is performed after this step.

At step 1002, when a start operation for the prompting message is received, the logistics information aggregation function is started, and the flow is ended.

The start operation may be a sliding operation, a clicking operation or a long-press operation acting on the prompting message, or may be an operation of clicking a start option in the prompting message, for example, an operation of clicking a "Start Now" option 1103 shown in FIG. 11. The present aspect does not limit thereto.

When the terminal starts the logistics information aggregation function, all pieces of logistics information may be aggregated and displayed in the preset display area after the logistics information of items in various e-commerce clients is acquired. That is, step 207 is executed.

At step 1003, when a viewing operation acting on an application to which the logistics information aggregation function belongs is received, a setting page is displayed in accordance with the viewing operation. The setting page is used to enable or disable the logistics information aggregation function.

The viewing operation is different from the start operation, and may be a sliding operation, a clicking operation or a long-press operation acting on the prompting message, or may be an operation of clicking a viewing area in the display area of the prompting message, such as an operation of clicking an area excluding the area corresponding to the "Start Now" option 1103 shown in FIG. 11, wherein the viewing area refers to any area excluding the area corresponding to the "Start" option. The present aspect does not limit thereto.

The setting page is equivalent to a detail page of the logistics information aggregation function. The user may view the setting page not only through the prompting message output by the terminal, but also by actively clicking an application to which the setting page belongs.

At step 1004, the logistics information aggregation function is started when the start operation acting on the setting page is received.

The setting page includes options of enabling and disabling the logistics information aggregation function. The terminal enables the logistics information aggregation function by receiving a start operation acting on the starting option, and disables the logistics information aggregation function by receiving the start operation acting on the stopping option. Wherein, the start operation may be a clicking operation or a sliding operation, and the present aspect does not limit thereto.

Figure 13:
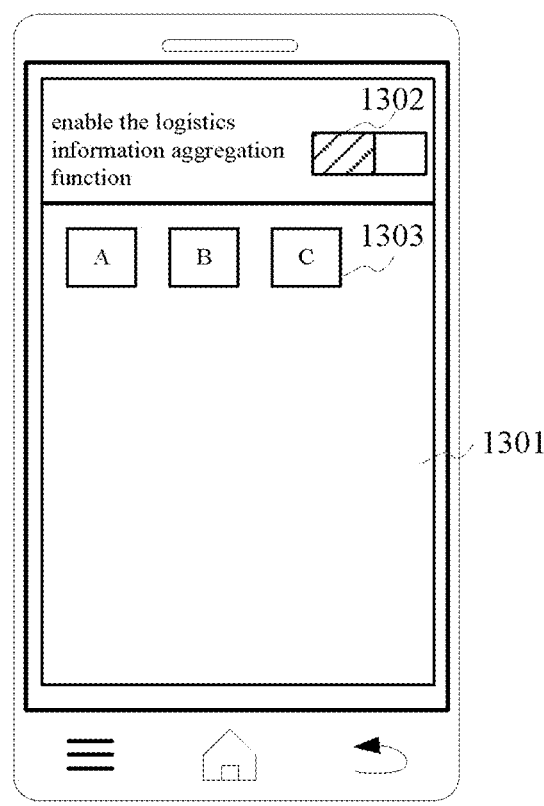
FIG. 13 is a schematic view of a setting page, according to an exemplary aspect of the present disclosure.

It is assumed that the setting page in the terminal is shown in FIG. 13. The starting and stopping options in the setting page 1301 correspond to the position of a slider 1302. When being positioned at the left side, the slider 1302 corresponds to the starting option; and when being positioned at the right side, the slider 1302 corresponds to the stopping option. When the terminal receives an operation of sliding the slider 1302 leftwards, the slider 1302 is displayed at the left side, and the logistics information aggregation function is enabled.

In some aspects, in order to enable the user to know the clients from which come the logistics information that the terminal may aggregate, the terminal may display e-commerce clients with the logistics information aggregation function in the setting page, for example, an e-commerce client 1303 shown in FIG. 13.

It should be noted that steps 1002 and 1003 are two parallel steps that cannot be executed at the same time.

In summary, with the logistics information display method provided by the present disclosure, the prompting message is output to remind the user to enable the logistics information aggregation function, so that the terminal may remind the user to enable the logistics information aggregation function when the logistics information aggregation function is not enabled, thereby improving the efficiency that the user views the logistics information.

Figure 14:
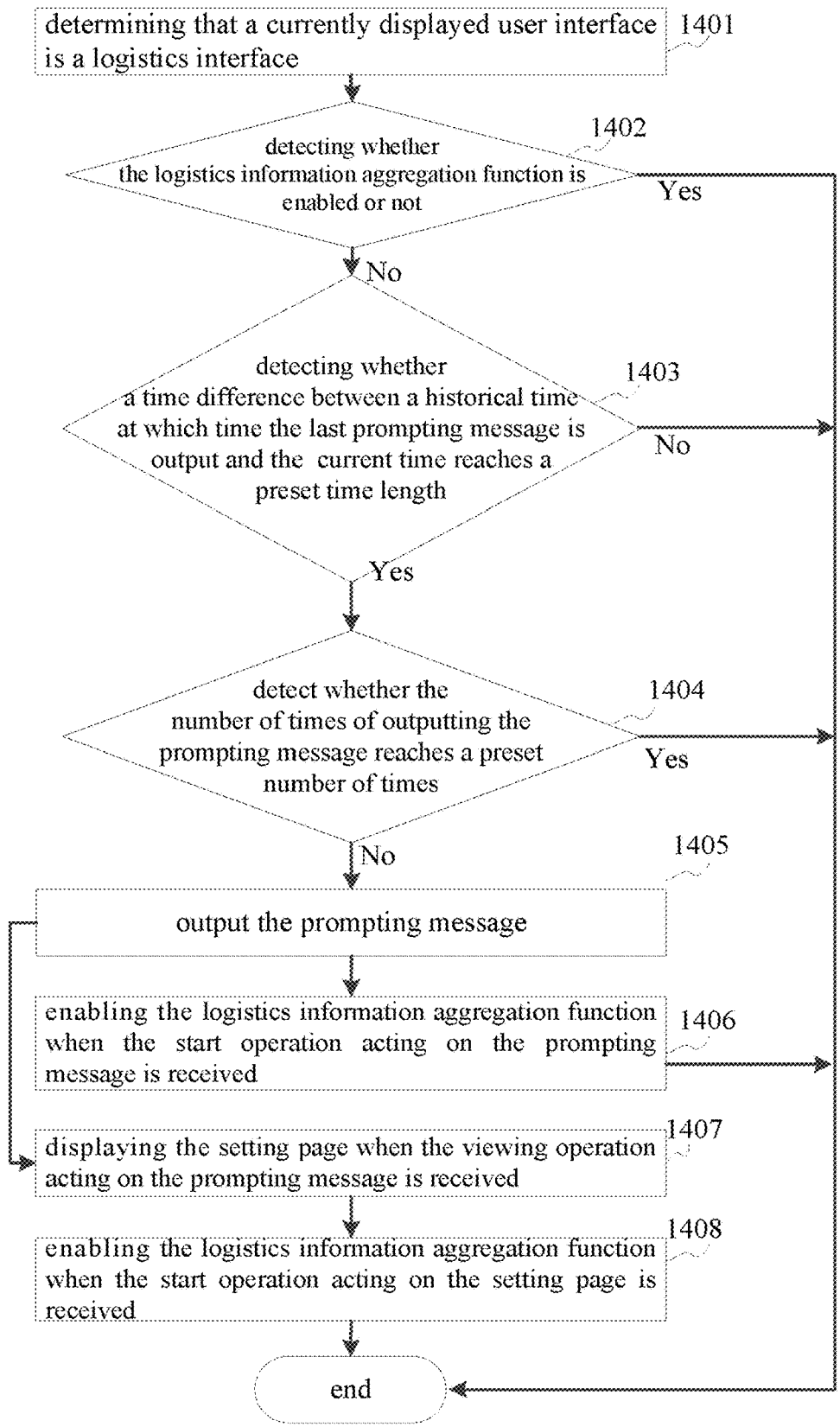
FIG. 14 is a flow chart of a logistics information display method, according to another exemplary aspect of the present disclosure.

In order to more clearly describe the flow of enabling the logistics information aggregation function after the terminal outputs the prompting message, a flow for enabling the logistics information aggregation will be described below by way of example. Referring to FIG. 14, the flow includes the following steps.

At step 1401, it is determined that a currently displayed user interface is a logistics interface.

At step 1402, whether a logistics information aggregation function is enabled or not is detected.

When it is detected that the logistics information aggregation function is not enabled, step 1403 is executed; or when it is detected that the logistics information aggregation function is enable, the flow is ended.

At step 1403, whether a time difference between a historical time at which time the last prompting message is output and the current time reaches a preset time length is detected.

When the preset time length is reached, step 1404 is executed; and when the preset time length is not reached, the flow is ended.

At step 1404, whether the number of times of outputting the prompting message reaches a preset number of times is detected.

When the preset number of times is not reached, step 1405 is executed; or if the preset number of times is reached, the flow is ended.

At step 1405, the prompting message is output.

At step 1406, when the start operation acting on the prompting message is received, the logistics information aggregation function is enabled, and the flow is ended.

At step 1407, when the viewing operation acting on the prompting message is received, a setting page is displayed.

At step 1408, when the start operation acting on the setting page is received, the logistics information aggregation function is enabled.

Figure 15:
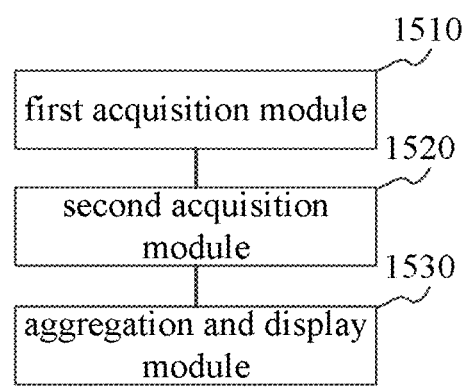
FIG. 15 is a block diagram of a logistics information display device, according to an exemplary aspect of the present disclosure.

FIG. 15 is a block diagram of logistics information display device shown in accordance with an exemplary aspect. The device has a function of implementing the aspect of the method described above, wherein the function can be implemented by hardware, or by corresponding software executed by the hardware. The device may include: a first acquisition module 1510, a second acquisition module 1520 and an aggregation and display module 1530.

The first acquisition module 1510 is configured to execute step 101 and step 205;

The second acquisition module 1520 is configured to execute step 102 and step 206;

The aggregation and display module 1530 is configured to execute step 103 and step 207.

For details, please refer to the aspects shown in FIG. 1 and FIG. 2.

In summary, with the logistics information display device provided by the present disclosure, the logistics waybill identifier in the at least one e-commerce client is acquired, and the logistics information corresponding to each logistics waybill identifier is aggregated and displayed in the preset display area provided by the operating system, so that the terminal allows the user to view the logistics information of the item in the at least one e-commerce client without switching user interfaces back and forth, solving the problems that the consumption of the resource of the terminal is excessive, and the efficiency that the user views the logistics information is lower when the terminal switches user interfaces back and forth for displaying the logistics information in the at least one e-commerce client. Therefore, the resource of the terminal is saved, and the efficiency that the user views the logistics information is improved.

Figure 16:
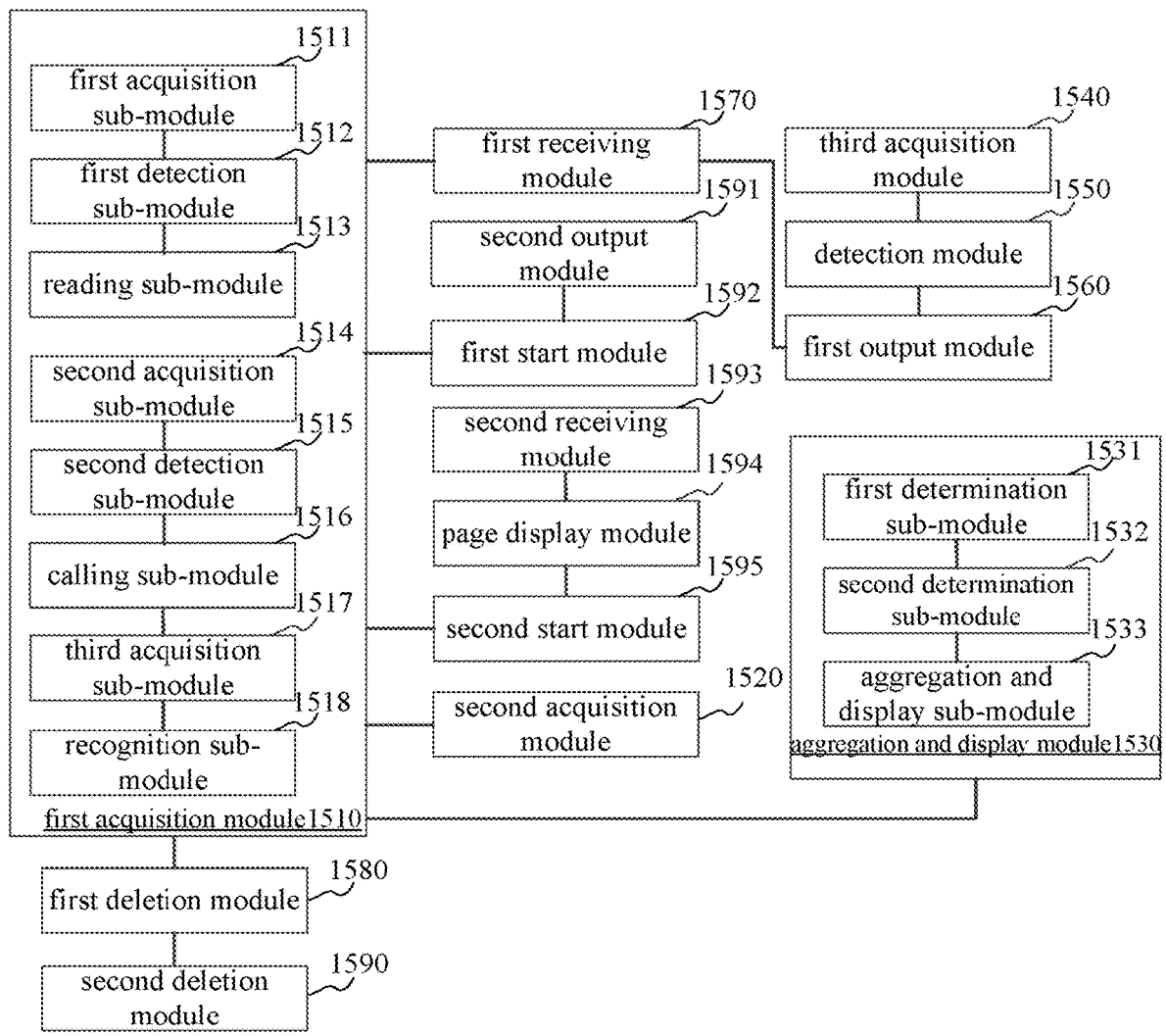
FIG. 16 is a block diagram of a logistics information display device, according to another exemplary aspect of the present disclosure.

In some aspects, in an alternative aspect based on FIG. 15, as shown in FIG. 16, the first acquisition module 1510 includes: a first acquisition sub-module 1511, a first detection sub-module 1512 and a reading sub-module 1513.

The first acquisition sub-module 1511 is configured to acquire first attribute information of an Activity currently running in a foreground;

The first detection sub-module 1512 is configured to detect whether a foreground user interface is the logistics page of the e-commerce client or not in accordance with the first attribute information of the Activity, acquired by the first acquisition sub-module 1511.

The reading sub-module 1513 is configured to read the logistics waybill identifier from the Activity when a detection result of the first detection sub-module 1512 shows that the foreground user interface is the logistics page of the e-commerce client.

In some aspects, the first acquisition module 1510 includes: a second acquisition sub-module 1514, a second detection sub-module 1515, a calling sub-module 1516, a third acquisition sub-module 1517 and a recognition sub-module 1518.

The second acquisition sub-module 1514 is configured to acquire the first attribute information of the Activity currently running in the foreground;

The second detection sub-module 1515 is configured to detect whether the foreground user interface is the logistics page of the e-commerce client or not in accordance with the first attribute information of the Activity, acquired by the second acquisition sub-module 1514;

The calling sub-module 1516 is configured to call a screenshot interface in the operating system when the detection result of the second detection sub-module 1515 shows that the foreground user interface is the logistics page of the e-commerce client;

The third acquisition sub-module 1517 is configured to acquire a page image corresponding to the logistics page through the screenshot interface called by the calling sub-module 1516; and The recognition sub-module 1518 is configured to recognize the logistics waybill identifier from the page image acquired by the third acquisition sub-module 1517.

In some aspects, the device further includes: a third acquisition module 1540, a detection module 1550, a first output module 1560 and a first receiving module 1570.

The third acquisition module 1540 is configured to execute step 201;

The detection module 1550 is configured to execute step 202;

The first output module 1560 is configured to execute step 203; and

The first receiving module 1570 is configured to execute step 204.

In some aspects, the second acquisition module 1520 is further configured to: call a logistics query interface in the operating system, and inquire the logistics information through the logistics query interface in the operating system; or, call a logistics query interface in a third party application, and inquire the logistics information through the logistics query interface in the third party application.

In some aspects, the preset display area is an area of a desktop widget, or a predetermined area in a notification bar.

In some aspects, the logistics information includes an overall logistics progress comprising at least one of being on the way, having been shipped, having difficulty in delivery, having been signed after reception, having been signed out, being in distribution and being returned, and the aggregation and display module 1530 includes: a first determination sub-module 1531, a second determination sub-module 1532 and an aggregation and display sub-module 1533.

The first determination sub-module 1531 is configured to determine a priority level corresponding to the logistics information in accordance with a preset corresponding relationship including a corresponding relationship between the overall logistics progress and the priority level.

The second determination sub-module 1532 is configured to determine a corresponding target display position of the logistics information in the preset display area in accordance with the priority level determined by the first determination sub-module 1531, wherein at least two display positions in the preset display area are ranked in a descending order of according to priority level; and The aggregation and display sub-module 1533 is configured to display the logistics information at the corresponding target display position determined by the second determination sub-module 1532.

In some aspects, the device further includes: a first deletion module 1580 and a second deletion module 1590.

The first deletion module 1580 is configured to delete the logistics information from the preset display area when the overall logistics progress in the logistics information is one of having been shipped, having been signed after reception, having difficulty in delivery, having been signed out and being returned, and a time length for displaying the logistics information in an aggregated manner reaches a preset time length threshold; and The second deletion module 1590 is configured to delete the logistics information when a deletion operation for the logistics information in the preset display area is received.

In some aspects, the device further includes: a second output module 1591 and a first start module 1592.

The second output module 1591 is configured to execute step 1001; and

The first start module 1592 is configured to execute step 1002.

In some aspects, the device further includes: a second receiving module 1593, a page display module 1594 and a second start module 1595.

The second receiving module 1593 is configured to receive a viewing operation acting on a outputted prompting message; or, receive a viewing operation acting on an application to which the logistics information aggregation function belongs;

The page display module 1594 is configured to execute step 1003; and

The second start module 1595 is configured to execute step 1004.

For details, please refer to the aspects shown in FIG. 2 and FIG. 10.

Noticeably, the device provided in the above aspect is exemplified only by the above division of each of the functional modules when the functions are implemented. In practice, the above-described functions may be assigned and completed by different functional modules in accordance with requirements. That is, the internal structure of the device can be divided into different functional modules to complete all or part of the functions described above.

With respect to the devices in the above aspects, the specific manners for performing operations for individual modules therein have been described in detail in the aspects regarding the methods, which will not be elaborated herein.

The aspects of the present disclosure further provide a logistics information display device capable of implementing the logistics information display method provided by the present disclosure. The device is applied in a first terminal device and includes: a processor; and a storage storing executable instructions executed by the processor. Wherein, the processor is configured to: acquire a logistics waybill identifier of at least one item from at least one e-commerce client capable of displaying a logistics page and installed in an operating system; acquire logistics information corresponding to the logistics waybill identifier, wherein the logistics information indicates a logistics progress of the item; and aggregate and display the acquired logistics information of the at least one item in a preset display area provided by the operating system.

In some aspects, the processor is configured to: acquire first attribute information of an Activity currently running in a foreground; and read the logistics waybill identifier from the Activity when determining from the first attribute information that a foreground user interface is the logistics page of the e-commerce client.

In some aspects, the processor is configured to: acquire first attribute information of an Activity currently running in a foreground; call a screenshot interface in the operating system when determining from the first attribute information that a foreground user interface is the logistics page of the e-commerce client; acquire a page image corresponding to the logistics page through the screenshot interface; and identify the logistics waybill identifier from the page image.

In some aspects, the processor is configured to: acquire second attribute information of a currently started main Activity, wherein a client identifier included in the second attribute information is different from a client identifier of another started Activity; output inquiry information when determining from the second attribute information that a client to which the main Activity belongs is the e-commerce client, wherein the inquiry information is used to inquire whether it is allowed to acquire the logistics waybill identifier in the logistics page of the e-commerce client or not; and receive a confirmation operation for the inquiry information, wherein the confirmation operation is used to trigger the operating system to acquire the logistics waybill identifier in the logistics page of the e-commerce client.

In some aspects, the processor is configured to: call a logistics query interface in the operating system, and inquire the logistics information through the logistics query interface in the operating system; or call a logistics query interface in a third party application, and inquire the logistics information through the logistics query interface in the third party application.

In some aspects, the preset display area is an area for a desktop widget, or a predetermined area in a notification bar.

In some aspects, the logistics information comprises an overall logistics progress comprising at least one of being on the way, having been shipped, having difficulty in delivery, having been signed after reception, having been signed out, being in distribution and being returned, and the processor is configured to: determine a priority level corresponding to the logistics information in accordance with a preset corresponding relationship including a corresponding relationship between the overall logistics progress and the priority level; determine a corresponding target display position of the logistics information in the preset display area in accordance with the priority level, wherein at least two display positions in the preset display area are ranked in a descending order in accordance with priority levels; and display the logistics information at the corresponding target display position.

In some aspects, the processor is configured to: delete the logistics information from the preset display area when the overall logistics progress in the logistics information is one of having been shipped, having been signed after reception, having difficulty in delivery, having been signed out and being returned, and a time length for displaying the logistics information in an aggregated manner reaches a preset time length threshold; and delete the logistics information when a deletion operation for the logistics information in the preset display area is received.

In some aspects, the processor is configured to: output a prompting message when the logistics information aggregation function is not enabled, wherein the prompting message prompts a user to enable a logistics information aggregation function, and the logistics information aggregation function is a function of aggregating the logistics information into the preset display area and displaying the aggregated logistics information; and enable the logistics information aggregation function when a start operation acting on the prompting message is received.

In some aspects, the processor is configured to: receive a viewing operation acting on an outputted prompting message, or receive a viewing operation acting on an application to which the logistics information aggregation function belongs, wherein the logistics information aggregation function is a function of aggregating the logistics information into the preset display area and displaying the aggregated logistics information; display a setting page in accordance with the viewing operation, wherein the setting page is used to enable or disable the logistics information aggregation function; and enable the logistics information aggregation function when a start operation acting on the setting page is received.

Figure 17:
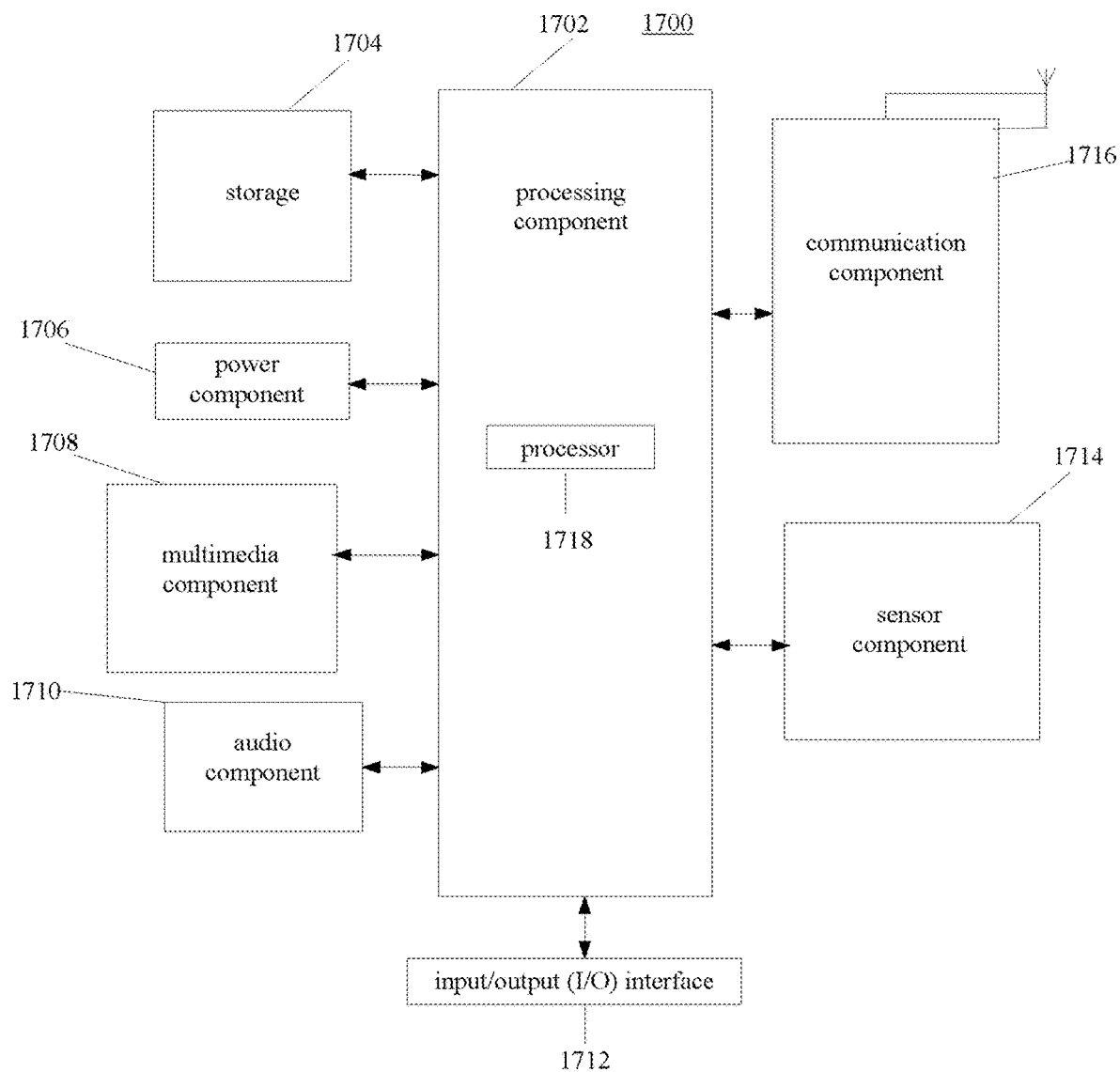
FIG. 17 is a block diagram of a device for displaying logistics information, according to an exemplary aspect of the present disclosure.

FIG. 17 is a block diagram of a device 1700, according to an exemplary aspect. For example, the device 1700 may be a mobile phone, a computer, a digital broadcast terminal, a messaging device, a game console, a tablet device, a medical device, an exercise device, a personal digital assistant, and the like.

As shown in FIG. 17, the device 1700 may include one or more of the following components: a processing component 1702, a storage 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The storage 1704 is configured to store various types of data to support operations of the device 1700. Examples of such data include instructions for any applications or methods operated on the device 1700, contact data, phonebook data, messages, pictures, video, etc. The storage 1704 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1708 includes a front camera and/or a rear camera. The front camera and the rear camera may receive an external multimedia datum while the device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the device 1700 is in an operation mode, such as a call mode, a recording mode, and a voice recognition mode. The received audio signal may be further stored in the storage 1704 or transmitted via the communication component 1716. In some aspects, the audio component 1710 further includes a loudspeaker to output audio signals.

The I/O interface 1712 provides an interface between the processing component 1702 and peripheral interface modules, such as a keyboard, a mouse, buttons, and the like. The buttons may include, but are not limited to, a home page button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some aspects, the sensor component 1714 may also include an accelerometer sensor, a gyroscope sensor, a magnetic sensor, a pressure sensor, or a temperature sensor.

The communication component 1716 is configured to facilitate communication, whether wired or wirelessly, between the device 1700 and other devices. The device 1700 can access a wireless network based on a communication standard, such as WiFi, 2G; or 3G; or a combination thereof. In one exemplary aspect, the communication component 1716 receives a broadcast signal or broadcast associated information from an external broadcast management system via a broadcast channel. In one exemplary aspect, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as the storage 1704 including instructions, which instructions can be executable by the processor 1720 in the device 1700, for performing the above-described methods. For example, the non-transitory computer-readable storage medium may be a ROM, a RAM, a CD-ROM, a magnetic tape, a floppy disc, an optical data storage device, and the like.

Alternatively, an aspect of the present disclosure provides a computer readable storage medium, storing at least an instruction, a program, a code set or instruction set, which are loaded and executed by the processor to: acquire a logistics waybill identifier of at least one item from at least one e-commerce client capable of displaying a logistics page and installed in an operating system; acquire logistics information corresponding to the logistics waybill identifier, wherein the logistics information indicates a logistics progress of the item; and aggregate and display the acquired logistics information of the at least one item in a preset display area provided by the operating system.

A non-transitory computer-readable storage medium including instructions that when executed by the processor of the device 1700 cause the device 1700 to perform the above-described methods is provided.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and aspects are considered as exemplary only, and a true scope and spirit of the disclosure is indicated by the following claims.

It will be appreciated that the present disclosure is not limited to the exact structure that has been described above and illustrated in the accompanying drawings, and that various modifications and changes can be made without departing from the scope thereof. It is intended that the scope of the disclosure only be limited by the appended claims.

What is claimed is:

1. A logistics information display method, executed by an operating system via processing circuitry of a terminal on which a plurality of e-commerce clients are installed, each of the plurality of e-commerce clients being configured to display a logistics page, and the method comprising:

acquiring, via the processing circuitry, first attribute information of a first activity running in a foreground;

determining, via the processing circuitry, based on the first attribute information, whether a first user interface in the foreground is a logistics page any of the plurality of e-commerce clients:

identifying, via the processing circuitry, in response to determining that the first user interface in the foreground is a logistics page of one of the plurality of e-commerce clients, a first logistics waybill identifier from the first activity, the e-commerce client to which the logistics page belongs being a first e-commerce client;

calling, via the processing circuitry, a first logistics query interface in the operating system;

acquiring, via the processing circuitry, through the first logistics query interface in the operating system, first logistics information corresponding to the first logistics waybill identifier, wherein the first logistics information indicates logistics progresses of a first item;

acquiring, via the processing circuitry, second attribute information of a second activity running in the foreground;

determining, via the processing circuitry, based on the second attribute information, whether a second user interface in the foreground is a logistics page of any of the plurality of e-commerce clients, identifying, via the processing circuitry, in response to determining that the second user interface in the foreground is a logistics page of a second one of the plurality of e-commerce clients other than the first e-commerce client, a second logistics waybill identifier from the second activity, calling, via the processing circuitry, a second logistics query interface in the operating system, acquiring, via the processing circuitry, through the second logistics query interface in the operating system, second logistics information corresponding to the second logistics waybill identifier, wherein the second logistics information indicates logistics progresses of a second item, aggregating, via the processing circuitry, the first and second acquired logistics information of the plurality of items; and displaying, via the processing circuitry, the aggregated first and second logistics information in a preset display area provided by the operating system, wherein the preset display area does not belong to any of the plurality of e-commerce clients, and is an area in a desktop bookmark or in a notification bar.

2. The method of claim 1, wherein the first and second logistics information includes an overall logistics progress including at least one of being in transit, having been shipped, having difficulty in delivery, having been signed after reception, having been signed out, being in distribution and being returned, and wherein aggregating and displaying the first and second acquired logistics information includes: determining a priority level corresponding to the first and second logistics information based on a preset corresponding relationship including a corresponding relationship between the overall logistics progress and the priority level; determining a corresponding target display position of the logistics information in the preset display area based on the priority level, wherein at least two display positions in the preset display area are ranked in a descending order based on priority levels; and displaying the first and second logistics information at the corresponding target display position.

3. The method of claim 1, further comprising: deleting the first and second logistics information from the preset display area when an overall logistics progress in the logistics information is one of having been shipped, having been signed after reception, having difficulty in delivery, and having been signed out and being returned, and wherein a time length for displaying the first and second logistics information in an aggregated manner reaches a preset time length threshold.

4. The method of claim 1, further comprising: outputting a prompting message when a logistics information aggregation function is not enabled, wherein the prompting message is configured to prompt a user to enable a logistics information aggregation function, wherein the logistics information aggregation function is a function of aggregating the first and second logistics information into the preset display area and displaying the aggregated logistics information; receiving a start operation acting on the prompting message; and enabling the first and second logistics information aggregation function when the start operation is received.

5. The method of claim 1, further comprising: receiving a viewing operation acting on an outputted prompting message, or receiving a viewing operation acting on an application to which the logistics information aggregation function belongs, wherein the logistics information aggregation function is a function of aggregating the first and second logistics information into the preset display area and displaying the first and second aggregated logistics information;
displaying a setting page based on the viewing operation, wherein the setting page is configured to enable or disable the logistics information aggregation function;
receiving a start operation acting on the setting page; and enabling the logistics information aggregation function when the start operation is received.

6. A logistics information display device, applied to an operating system of a terminal on which a plurality of e-commerce clients are installed, each of the e-commerce clients being configured to display a logistics page, and the device comprising: a processor;
a memory configured to store executable instructions executed by the processor, wherein the processor is configured to: acquire first attribute information of a first activity running in a foreground, determine, based on the first attribute information, whether a first user interface in the foreground is a logistics page of any of the plurality of e-commerce clients,
identify, in response to determining that the first user interface in the foreground is a logistics page of one of the plurality of e-commerce clients, a first logistics waybill identifier from the first activity, the one of plurality of e-commerce client to which the logistics page belongs being a first e-commerce client,
call a first logistics query interface in the operating system;
acquire, through the first logistics query interface in the operating system, first logistics information corresponding to the first logistics waybill identifier, wherein the first logistics information indicates logistics progresses of a first item: acquire second attribute information of a second activity running in the foreground;
determine, based on the second attribute information, whether a second user interface in the foreground is a logistics page of any of the plurality of e-commerce clients, identify, in response to determining that the second user interface in the foreground is a logistics page of a second one of the plurality of e-commerce clients other than the first e-commerce client, a second logistics waybill identifier from the second activity, call a second logistics query interface in the operating system acquire, through the second logistics query interface in the operating system, second logistics information corresponding to the second logistics waybill identifier, wherein the second logistics information indicates logistics progresses of a second item;
aggregate the acquired first and second logistics information of the plurality of items;
and display the first and second aggregated logistics information in a preset display area provided by the operating system, wherein the preset display area does not belong to any of the plurality of e-commerce clients, and is an area in a desktop bookmark or in a notification bar.

7. The device of claim 6, wherein the logistics information includes an overall logistics progress including at least one of being in transit, having been shipped, having difficulty in delivery, having been signed after reception, having been signed out, being in distribution and being returned, and wherein the processor is further configured to: determine a priority level corresponding to the logistics information based on a preset corresponding relationship including a corresponding relationship between the overall logistics progress and the priority level; determine a corresponding target display position of the first and second logistics information in the preset display area based on the priority level, wherein at least two display positions in the preset display area are ranked in a descending order based on priority levels; and display the first and second logistics information at the corresponding target display position.

8. The device of claim 6, wherein the processor is further configured to: delete the logistics information from the preset display area when an overall logistics progress in the first and second logistics information is one of having been shipped, having been signed after reception, having difficulty in delivery, and having been signed out and being returned, and wherein a time length for displaying the first and second logistics information in an aggregated manner reaches a preset time length threshold.

9. The device of claim 6, wherein the processor is further configured to: output a prompting message when the logistics information aggregation function is not enabled, wherein the prompting message is configured to prompt a user to enable a logistics information aggregation function, and wherein the logistics information aggregation function is a function of aggregating the first and second logistics information into the preset display area and displaying the aggregated first and second logistics information; receiving a start operation acting on the prompting message; and enable the logistics information aggregation function when the start operation is received.

10. The device of claim 6, wherein the processor is further configured to: receive a viewing operation acting on an outputted prompting message, or receive a viewing operation acting on an application to which a logistics information aggregation function belongs, wherein the logistics information aggregation function is a function of aggregating the first and second logistics information into the preset display area and displaying the aggregated first and second logistics information;
display a setting page based on the viewing operation received by the second receiving module, wherein the setting page is configured to enable or disable the logistics information aggregation function;
receiving a start operation acting on the setting page; and enable the logistics information aggregation function when the start operation displayed by the page display module is received.

11. A computer readable storage medium, applied to an operating system of a terminal on which a plurality of e-commerce clients are installed, each of the e-commerce clients being configured to display a logistics page, and the computer readable storage medium storing instructions via processing circuitry that, when executed by one or more processors of the terminal, cause the terminal to:

acquire first attribute information of a first activity running in a foreground;

determine, based on the first attribute information, whether a first user interface in the foreground is a logistics page of any of the plurality of e-commerce clients, identify, in response to determining that the first user interface in the foreground is a logistics page of one of the plurality of e-commerce clients, a first logistics waybill identifier from the first activity, the one of the plurality of e-commerce client to which the logistics page belongs being a first e-commerce client:

call a first logistics query interface in the operating system;

acquire, through the first logistics query interface in the operating system, first logistics information corresponding to the logistics waybill identifier, wherein the first logistics information indicates logistics progresses of a first item;

acquire second attribute information of a second activity running in the foreground;

determine, based on the second attribute information, whether a second user interface in the foreground is a logistics page of any of the plurality of e-commerce clients;

identify, in response to determining that the second user interface in the foreground is a logistics page of a second one of the plurality of e-commerce clients other than the first e-commerce client, a second logistics waybill identifier from the second activity;

call a second logistics query interface in the operating system acquire, through the second logistics query interface in the operating system, second logistics information corresponding to the second logistics waybill identifier, wherein the second logistics information indicates logistics progresses of a second item;

aggregate the first and second acquired logistics information of the plurality of items; and display the first and second aggregated logistics information in a preset display area provided by the operating system, wherein the preset display area does not belong to any of the plurality of is e-commerce clients, and is an area in a desktop bookmark or in a notification bar.

* * * * *